April 14, 1953  S. S. JOHNS  2,634,703
APPARATUS FOR PROCESSING INTERIOR SURFACES
OF TUBULAR ARTICLES AND THE LIKE
Filed Sept. 20, 1950  6 Sheets-Sheet 6
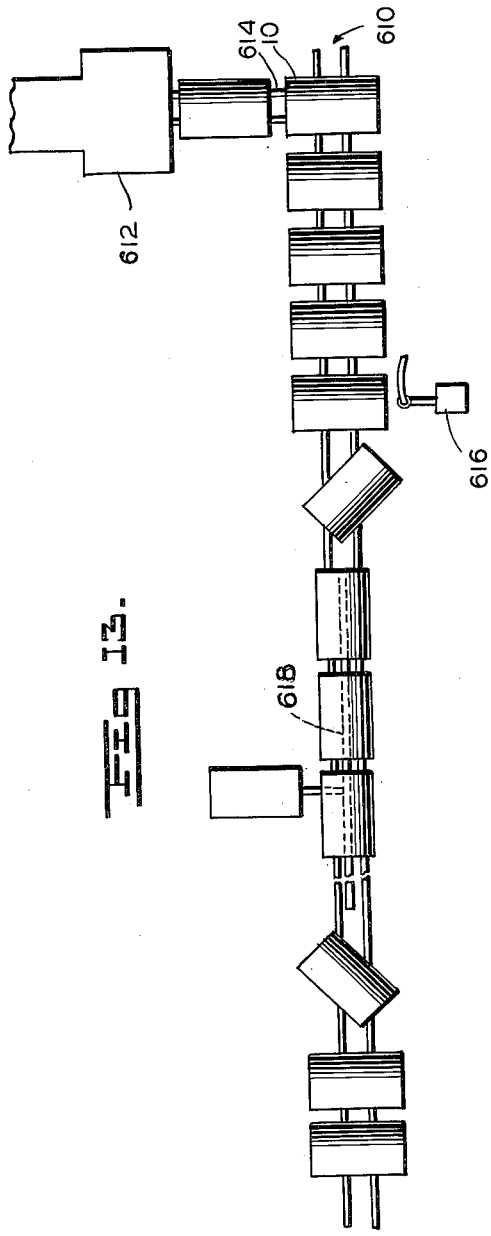
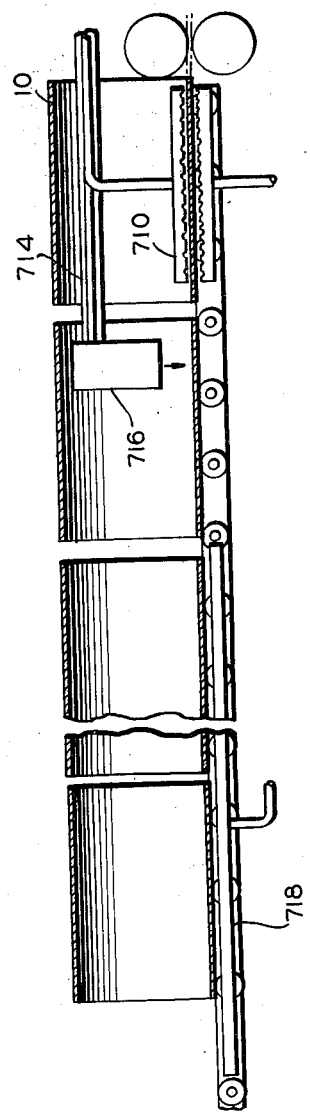
INVENTOR.
STANLEY S. JOHNS
BY
Cushman, Darby & Cushman
ATTORNEYS Patented Apr. 14, 1953

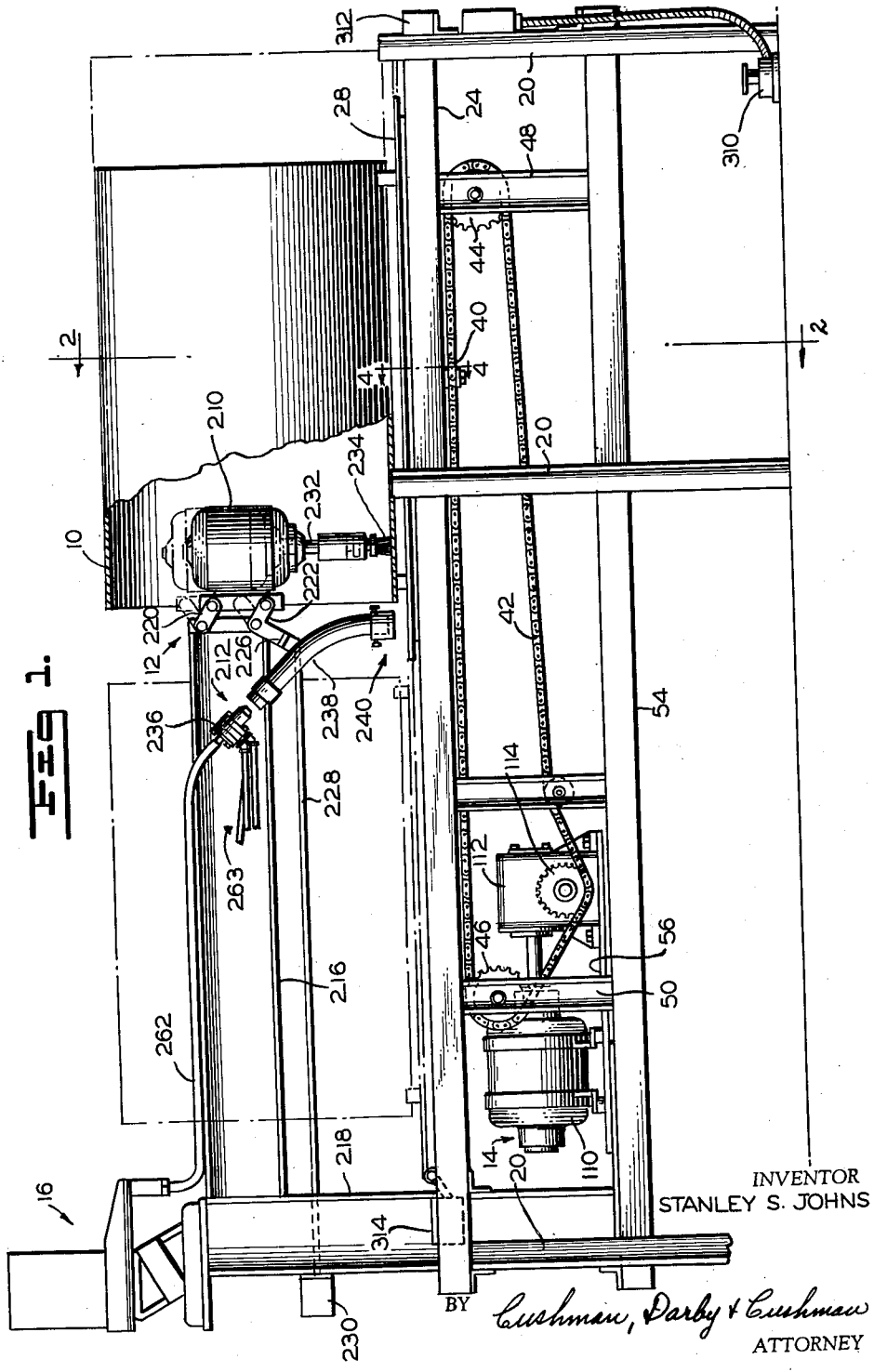

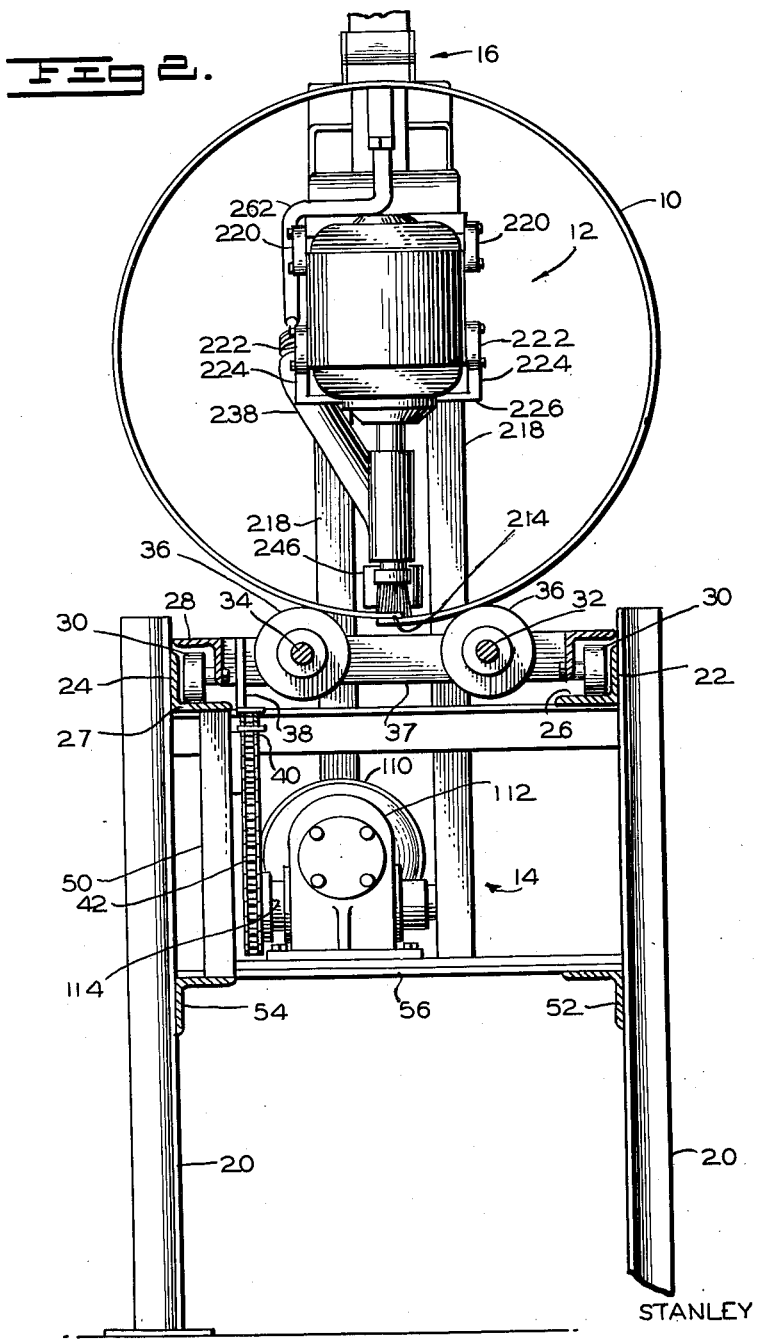

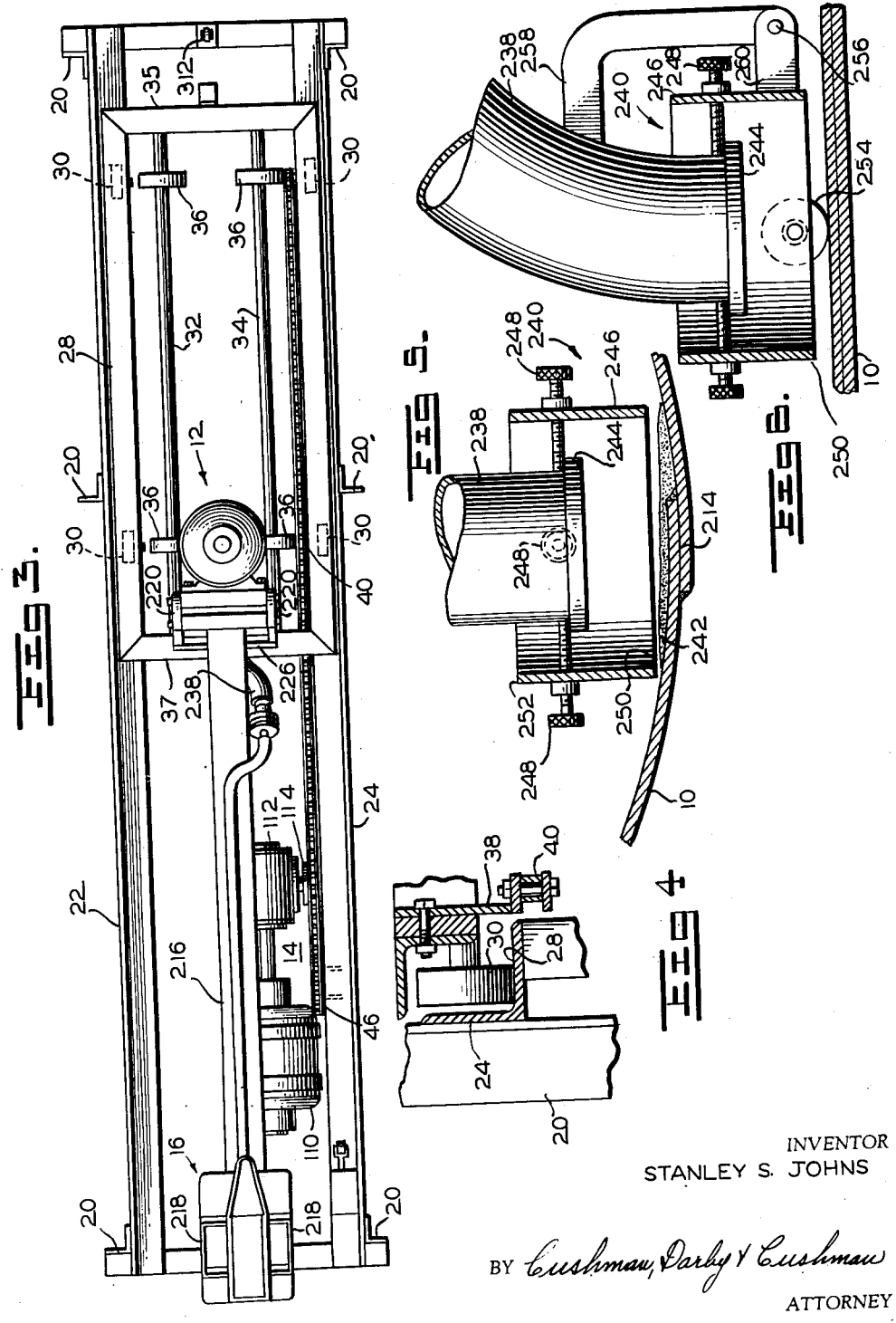

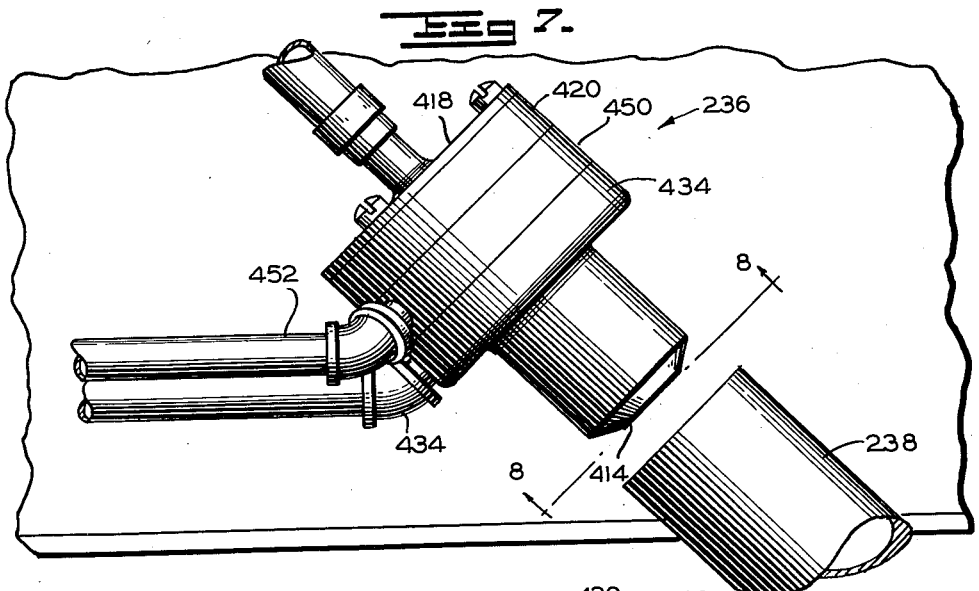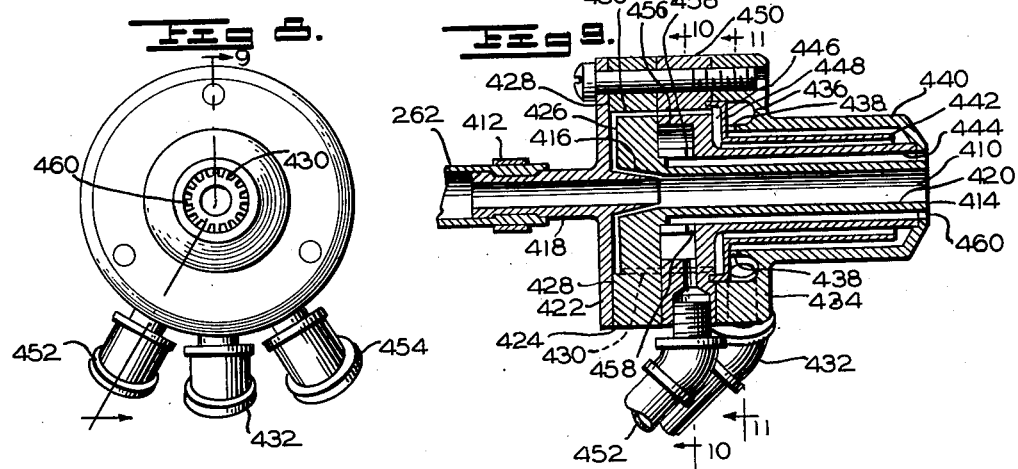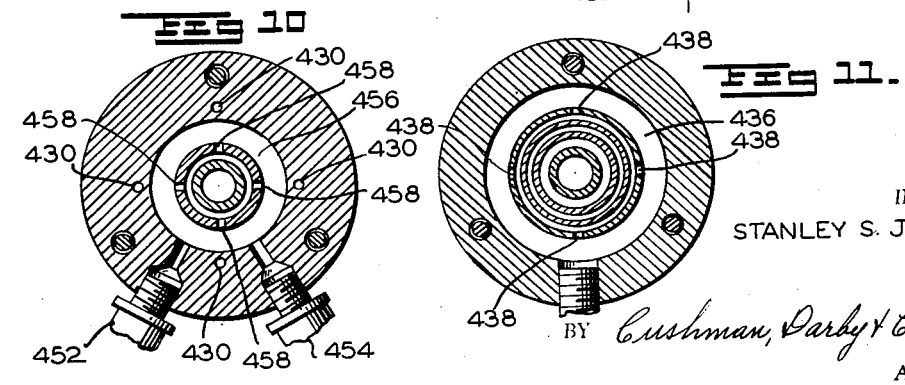

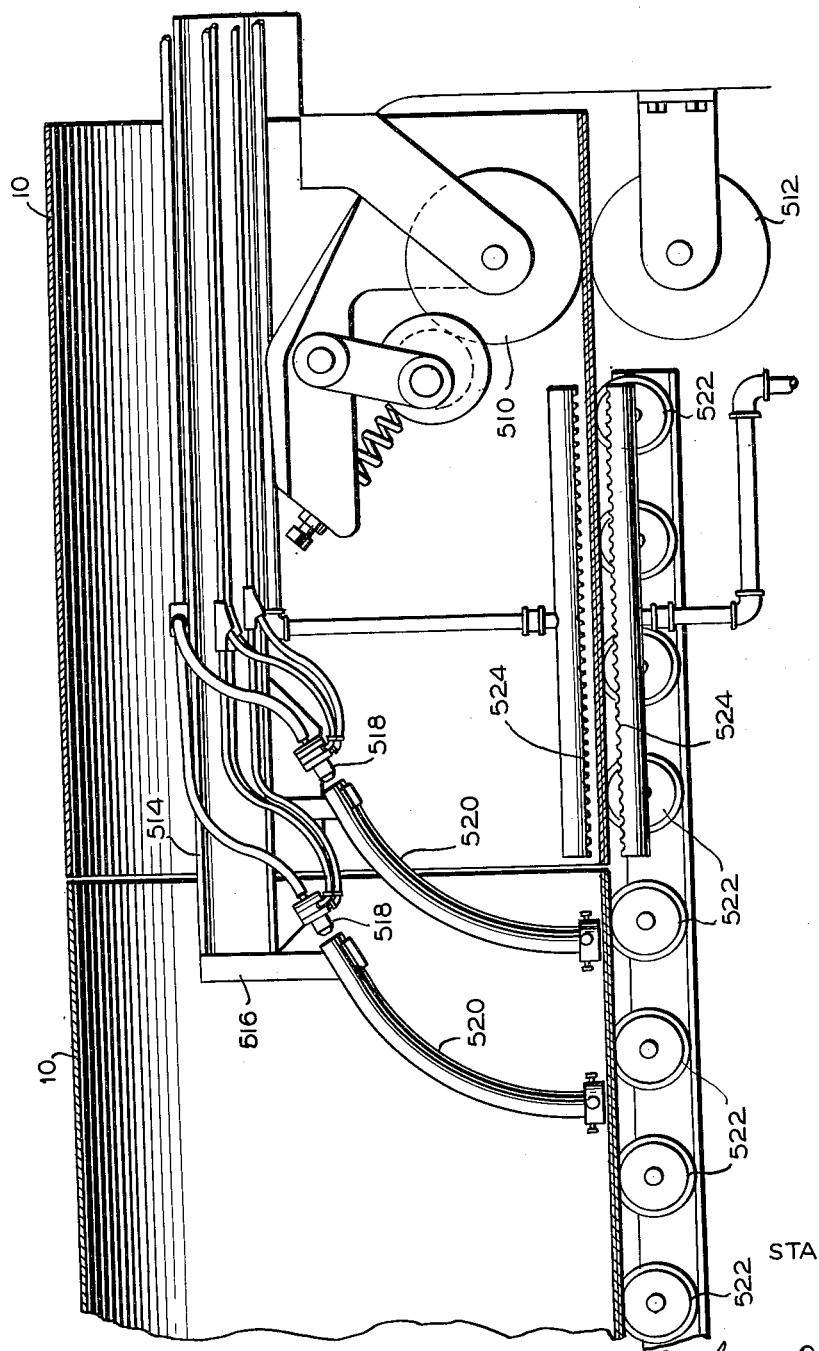

2,634,703

UNITED STATES PATENT OFFICE 2,634,703

APPARATUS FOR PROCESSING INTERIOR SURFACES OF TUBULAR ARTICLES AND THE LIKE

Stanley S. Johns, Baltimore, Md., assignor to Rheem Manufacturing Company, Richmond, Calif., a corporation of California Application September 20, 1950, Serial No. 185,826

4 Claims. (Cl. 118—72)

This invention relates to methods and apparatus for processing the interior surfaces of tubular articles and the like.

The invention relates generally, but not necessarily, to the processing of tubular interiors in connection with conveyor line handling of such tubular objects. The invention will be described mainly in relation to the coating of welded seams of tubular articles, such as steel drums. The invention is not intended to be limited to the processing of such drums, however, and the application of the invention to many other types of articles will become fully apparent as the description proceeds.

The invention also comprises a means, as far as I am aware, not previously known in the art of flame spraying.

It is, therefore, an object of my invention to provide means for processing the interior surfaces of tubular or like articles.

It is a further object of my invention to provide means to be employed in conjunction with conveyor line systems for processing the interior surfaces of tubular or like articles.

It is a further object of my invention to provide an improved means for producing a flame spray from a powdered composition, such as a polythene composition.

It is a further object of my invention to provide improved means for flame spraying a coating, such as a polythene coating on a surface.

It is a further object of my invention to provide means for directing a flame spray to a predetermined portion of a surface.

It is a further object of my invention to provide a method and apparatus for burnishing and coating the interior surface of a tubular or like article in an automatically coordinated operation.

It is a further object of my invention to provide a method and apparatus for processing the interior surfaces of tubular or like articles as they are formed into tubular or like shape from sheet material.

It is a further object of my invention to provide a method and apparatus for a combined welding and interior coating operation and including means for properly cooling and heating the welded seams so that the coating is properly applied and baked.

Further objects and the entire scope of my invention will become apparent from the following detailed description of preferred embodiments of my invention. It is not intended that the particular embodiments, which are illustrated and described, shall limit my invention. These embodiments are described only for purposes of illustration.

The most complete understanding of the described embodiments may be had with reference to the accompanying drawings, in which:

Figure 1 shows a side view of a combined burnishing and coating apparatus.

Figure 2 is a view of the apparatus in Figure 1 taken on the line 2—2 of Figure 1.

Figure 3 shows a plan view of the apparatus in Figure 1.

Figure 4 shows a detail view taken along the line 4—4 of Figure 1.

Figure 5 shows a means of supporting the end of a blast tube, shown in Figure 1.

Figure 6 shows a modification of the structure shown in Figure 5.

Figure 7 shows my improved flame spray apparatus.

Figure 8 is an end view of the apparatus of Figure 7 taken along the line 8—8 of Figure 7.

Figure 9 is a cross-sectional view taken along the line 9—9 of Figure 8.

Figure 10 is a sectional view taken along the line 10—10 of Figure 9.

Figure 11 is a sectional view taken along the line 11—11 of Figure 9.

Figure 12 shows apparatus for combining a seam welding and coating operation.

Figure 13 is a diagrammatic showing of a coordinated welding, coating and heating operation in conjunction with a conveyor line.

Figure 14 shows another embodiment of the combination of Figure 13.

Referring now to Figures 1–4, and primarily to Figure 1, an apparatus is illustrated in which a tubular article 10 is adapted to be reciprocated in a horizontal direction, and while being so moved, undergoes a processing operation along a previously welded seam by means of the processing apparatus indicated generally at 12. The reciprocating motion of the container is automatically placed under the control of the motor driving unit, indicated generally as 14, and material which is to form part of a coating on the seam of the article 10 is delivered from a supply structure, indicated generally as 16.

In greater detail, upstanding supporting members 20 are provided to which are attached longitudinal side rails 22 and 24. The rails 22 and 24 are of an L-section having their lower sides extending horizontally and inwardly to provide horizontal surfaces 26 and 27, respectively, upon which a carriage 28 may ride. The carriage 28 is supported for movement on the rails 22 and 24 by means of small wheels or rollers 30 mounted at substantially the four corners of the carriage. The carriage itself is made up of L-section members as can be best observed in Figure 2.

On the carriage 28 are mounted two supporting bars 32 and 34, these bars being supported at their ends in the cross-wise or end L-sections of the carriage 28. These end sections are designated 35 and 37 in the drawings. Rotatably mounted on the bars 32 and 34 are wheels 36 employed to support the article 10 for rotation about its axis. This can be best appreciated from the showing in Figure 2.

A protruding arm 38 is fixed to the carriage 28 along the left-hand side of the carriage (as viewed in Figure 2), and this arm extends downwardly of the carriage for connection to a drive chain at a point 40. The drive chain, designated as 42, runs over idler sprockets 44 and 46 which are rotatably mounted on upright supporting members 48 and 50. These supporting members extend between the upper side rail 24 and lower horizontal drive supporting rails 52 and 54.

The drive unit, previously indicated generally as 14, is supported on the rails 52 and 54 by means of a transverse plate 56. The drive unit 14 is made up of a preferably reversible motor 110 driving a reduction gear box 112, the latter having an output drive sprocket 114. The chain 42, previously described as extending over the idler sprockets 44 and 46, is then also trained over the drive sprocket 114 and any additional idler sprockets as may be desired.

From the apparatus as thus far described, it will be apparent that as the motor 110 is operated in a forward direction, the arm 38 connected to the chain 42 at point 40 will cause the carriage 28 to move forwardly (to the left in Figure 1) and cause the article 10 to move relative to the processing devices indicated generally as 12. When the motor 110 is reversed, the carriage and container will be returned to their original position.

The processing devices, indicated generally as 12, are in the illustrated embodiment comprised of a burnishing motor 210 and a flame spray apparatus indicated generally as 212. These units are intended to burnish and then coat a previously welded seam of the article 10, such a seam may take the form as indicated at 214 (Figures 2 and 5).

The motor 210 and the spray unit 212 are mounted on an I-beam 216, the latter being mounted in cantilever fashion from two upwardly extending beams 218 supported by the previously described framework. The motor 210 is mounted at the free end of the cantilever beam 216 on a parallelogram arrangement so that the motor can be raised and lowered with respect to the lower interior surface of the article 10. This parallelogram mounting consists of two upper parallelogram arms 220, and two lower parallelogram arms 222. The lower arms 222 are also provided with arms 224 which extend in bell-crank relationship and are interconnected with a cross support member 226. An operating rod 228 is then adapted to be connected at one end to the bell-crank arrangement comprising the arms 224, and at its other end to a solenoid operating device 230. The solenoid 230 is of any conventional variety and is arranged to reciprocate the operating rod 228 along the axis of the latter. It will thus be apparent that as the rod 228 is reciprocated to the right (Figure 1), the motor 210 will be raised.

The motor 210 is equipped at its lower end with a drive shaft 232 and mounted on this shaft is a burnishing brush 234.

The flame spray unit, indicated at 212, comprises a nozzle section designated as 236 and a blast tube section designated as 238. The nozzle unit 236, which will be described in more detail below, performs the function of spraying a molten substance into the upper end of the blast tube 238 and this tube directs the spray to an outlet end 240.

The details of the end 240 of the blast tube 238 may be best understood with reference to Figures 5 and 6. The spray which proceeds down the blast tube 238 may be created from a polythene powder (which will be more fully discussed below in connection with the nozzle 236). This spray will form a coating on the seam 214, as indicated at 242 in Figure 5. It will be realized, of course, that the coating may be any other suitable composition, including all types of paint and the like. The blast tube 238 is terminated a relatively great distance above the seam 214 at the rim 244. A surrounding tubular sleeve 246 is then mounted on the end of the blast tube 238 by means of four set screws 248, the latter clamping on the tube 238 adjacent the rim 244 thereof. The screws 248 provide adjustment of the sleeve 246 relative to the tube 238, this being desirable because the tube 238 itself is firmly attached to the I-beam 216. The lower edge 250 of the sleeve 246 is positioned closely adjacent the inner surface of the article 10 and will thus serve to substantially prevent the spreading of the coating material beyond the confines of sleeve 246. The upper end 252 of the sleeve 246, however, extends substantially above the lower opening of the tube 238 (at rim 244) and thus provides an upwardly erected exhaust channel for escaping gases which accompany the molten coating material. An effective means is thus provided for directing and confining the coating material within a predetermined area, and at the same time, permitting unused gases to escape upwardly about the tube 238.

To closely control the clearance of the lower sleeve edge 250 from the surface of the article 10, the sleeve 246 may be provided with rollers 254 (Figure 6) which will ride on the interior surface of the article 10. The sleeve 246 may be further mounted on the tube 238 by means of a pivotal support pin 256 which connects an arm 258 (extending from the blasting tube 238) with an arm 260 extending from the sleeve 246. With the use of this pivotal mounting, the set screws 248 may be loosened and while the blast tube is within the length of the article 10, the wheels 254 will support the sleeve 246. The rim 244 will serve to engage the loosened set screws 248 to limit the downward movement of the sleeve 246 about the pivot 256 when the article 10 is removed from proximity with the blast tube 238.

As an equivalent arrangement, the set screws 248 may firmly clamp the sleeve 246 to the tube 238 and the tube itself may be pivotally mounted on the I-beam 216 for limited movement.

The nozzle unit 236 is adapted to be supplied with a powdered composition from the supply means 16 through a suitable conduit 262, and to be supplied with necessary fluids under pressure through the connections indicated generally at 263. The supply means 16 may be controlled by a vibratory means (not shown) which, in the case of powder, will control the flow thereof through the conduit 262.

The apparatus as thus far described can be arranged for automatic operation in the following manner: Assuming, initially, that the carriage 28 is at its outermost or right-hand position (Figure 1), an article 10 is first placed upon the rollers 36, either by being placed thereon manually or by suitable lifting means (not shown) for lifting from an adjacent conveyor line. A foot switch 310 is then closed by the attending operator and the closing of this switch establishes a circuit through suitable relay contacts to energize the windings of motor 110 to drive this motor in a forward direction. This circuit which is established may also energize the vibrator associated with the supply means 16 to permit a flame spray to proceed through the tube 238, and may also energize the motor 210 to rotate the brush 234. At this time, the solenoid 230 will not be energized and the brush 234 will be in position to engage the article 10. The operation of the motor in a forward direction will move the pin 42 to cause the carriage 28 to move to the left (Figure 1), and, therefore, the brush 238 will burnish the seam and the blast tube 238 will subsequently produce the first layer of a coating on the seam.

The carriage in its right-hand position (Figure 1), is arranged to engage a limit switch 312 and, while thus engaged, to hold this switch in an open position. Switch 312 may be connected in parallel with foot switch 310 and as soon as the carriage 28 has moved to the left a sufficient distance to permit switch 312 to close, then switch 310 may be opened and the previously mentioned circuits will remain closed through switch 312.

When the carriage 28 reaches its most left-hand position (Figure 1), it will engage and close a normally opened limit switch 314. The switch 314 may be connected to energize the operating coil of a relay of which the previously mentioned relay contacts form a part. The operation of this relay may cause the windings of the motor 110 to be connected to reverse the rotation of this motor, while at the same time, the operation of the relay may (1) energize solenoid 230 to raise the brush 234, (2) cut off the supply means 16 if only one layer of coating is desired, and (3) close holding contacts which will hold the relay in operated position after the carriage 28 has moved toward the right (Figure 1), and the switch 314 has reopened. Due to the action of switch 314 has reopened, the carriage 28 will return to its original position and reopen the switch 312 before movement is stopped. Upon opening the switch 312, the relay holding circuit will be opened and the circuit thus set for another cycle of operation upon the subsequent closing of the foot switch 310.

From the foregoing circuit description, it will be apparent that the carriage 28 will initially move the article 10 so that the seam thereof is first burnished and then a coating applied thereto. Upon the return movement of the carriage, the burnishing brushes move out of the way to prevent destruction of the coating, and at the same time, a second layer of coating may be applied. It will, of course, be understood that a second layer may be dispensed with, or on the other hand, if more than two layers are desired, a suitable relay system could readily be provided to permit further reciprocations of the article 10 with the burnishing brush held in its uppermost position during this operation.

I have additionally discovered that in the processing of surfaces, such as the interior welded seam in steel drums, that a very effective coating consists of resins of polythene (polymerized ethylene). The use of such a coating derived from the powder has been difficult, however, with previous methods of flame spraying the powder or composition on the metal surface. By the use of the spraying nozzle, about to be described, however, a very satisfactory flame spray may be obtained.

The nozzle is the unit previously mentioned above and indicated by the numeral 236. A detailed understanding of this nozzle may now be had with reference to Figures 7–11.

The nozzle is built up around a centrally positioned aperture 410 which extends generally from a connection at 412 to the supply conduit 262 to its other end 414 located adjacent to the blast tube 238. The powdered composition is drawn from the supply conduit 262 and caused to be rapidly discharged from the end 414 by means of air pressure introduced into the central aperture 410 by means of a converging channel 416. As best shown in Figure 9, the converging channel 416 causes the air to be directed into the central aperture 410 in a direction nearly parallel to the direction of the particles moving from the conduit 262. It will be thus apparent that a blasting action takes place which rapidly accelerates the powdered composition through the nozzle. The "straight through" power feed has been found to be a very decided improvement over prior art devices having elbows which clog easily.

The converging channel 416 is structurally provided for by having the central aperture 410 made up of a rearward section 418 and a forward section 420. Each of the sections 418 and 420 have abutting flange members 422 and 424, respectively, and the latter flange is cut away, as at 426, leaving a shoulder 428 of section 420 to engage the outermost area of the flange 422 of the rearward section 418. The shoulder 428 thus creates a spacing between the inner diameters of the flanges of sections 418 and 420 and, accordingly, creates the channel 416. The air under pressure is supplied to the channel 416 by means of four apertures 430 extending from the inner edge of the shoulder 426 forwardly in a direction substantially parallel to the central aperture 410.

The air under pressure, which is applied through the channel 416, is initially applied through a hose connection 432 and this air is first used to cool certain associated structures. Without this novel cooling, the complete length of the central aperture will become overheated, with undesirable results. The hose connection 432 is mounted in a forward or enclosing section 434 of the nozzle structure, this section being provided with an annular channel 436 into which the air first passes. Upon being distributed in the channel 436, the air next passes through four openings 438 into a forwardly extending cylindrical chamber defined on its outside by a tubular wall 440 of the section 434, and defined at its inner side by a sleeve member 442. After proceeding from the channel 436 through the openings 438 and forwardly through the chamber defined by members 440 and 442, the air then turns inwardly around the most forward end of the sleeve 442 and proceeds in a rearward direction through an annular channel defined on its outside by the inner surface of the sleeve 442, and defined on its inside by the outer surface of a combustion chamber sleeve 444. The air is then made available to the forward ends of the apertures 430 through a chamber indicated as 446, the latter being defined on its forward side by an extending flange section 448 of the sleeve 442, and on its rearward side by a central nozzle section 450.

From the structure as thus far described, it will be apparent that air being supplied through connection 432 first proceeds forwardly through the outermost annular channel and then proceeds rearwardly through the next inner annular channel through the chamber 446 where it is made available to the apertures 430. From the latter apertures, the air is introduced into the converging channel 416 via the cut away section 426 and the powdered composition supplied from conduit 262 accordingly blasted out through the end 414 of the central aperture 410.

To create a flame spray, suitable gases, such as acetylene and oxygen, are introduced through piping connections 452 and 454, respectively, into an annular mixing and combustion chamber 456. This mixture is then permitted to escape through four openings 458 into an annular chamber defined at its outer side by the inner surface of the tube 444, and defined at its inner side by the outer wall of the forward section 420 of the central aperture structure 410. The outer end 414 of the central aperture structure 410 is characterized by a series of radially extending teeth 460 which abut at their outer edges the junction of the sleeve 444 and the outer casing 440 to form a series of jets immediately surrounding the end 414 of the central aperture 410. The gases which are mixed in the chamber 456 and are burning in the chamber extending from the openings 458 to the jets 460 are accordingly directed outwardly of the jets in a direction substantially parallel to the axis of the central aperture 410. The powdered composition which is being expelled from the central aperture is therefore completely heated and caused to assume a molten state.

As previously mentioned, the air pressure being supplied through the piping connection 432 passes over the outer surface of the sleeve member 444 and, accordingly, serves to cool this member.

The blast tube 238 is an important part of my invention. Without the use of such a tube I have found that a great deal of unmelted powder will issue from the nozzle, and, moreover, the spray will not be confined to a particular desired area of the surface to be coated.

The blast tube will become quite hot because of its proximity to the flame, and this heats and melts unmelted powder issuing from the nozzle. In some instances, it may be desirable to insulate the outer surface of the blast tube to build up the heat to high values. The size and length of the tube may also be selected to provide desired degrees of heat.

In the use of the apparatus described in connection with Figures 1 to 6, it is to be understood that the seam or other surface of the article may have been previously heated (as by a previous welding operation) and the articles have then been naturally or artificially cooled to a temperature level whereat the coating may be applied without danger of blistering. In other words, in utilizing the first described apparatus in the processing of the surfaces of the articles, a first step may comprise heating, and the coating operation is a later step in the process.

Another form of apparatus for carrying out a welding and coating operation will now be described with reference to Figure 12. In this showing, it is demonstrated how the coating operation may be carried on in coordination with a seam welding operation. Rollers 510 and 512 comprise the welding electrodes of any conventional seam welding device. Such welding apparatus is well-known to those skilled in the art and it is believed that no detailed description thereof is necessary herein. The general operation of such an apparatus is that a flat sheet of suitable metal is guided into cylindrical form and the overlapping or abutting edges thereof are then passed between the wheels 510 and 512 to form the seam. The sheet material would be moving from right to left, as viewed in Figure 12.

By my invention I provide a cantilever supporting beam 514, this beam being mounted on the framework of the welding apparatus and extending forwardly from this apparatus so that its free end 516 is positioned within the articles 10 "downstream" of the welding electrode rollers 510 and 512. Flame spray nozzles, designated as 518, and blast tubes, designated as 520, may then be suitably mounted on the cantilever beam 514 whereby as many coatings as desired may be applied to the welded seams. For purposes of illustration, only two nozzle-tube combinations are shown. It will be understood, however, that more can be employed and that a burnishing motor and brush, such as illustrated in Figures 1 to 6, may also be suitably mounted on the beam 514, if desired.

The articles 10 are supported in correct position for continuous movement by the rollers 522, which make up a conventional roll conveyor.

It will be further apparent that the flame spray units may be replaced with suitable means for spraying other types of coatings, such as paint or the like.

Inasmuch as a welding operation usually heats the seam to a temperature far above that which will accommodate a coating operation, the cooling jets 524 are provided for directing a blast of air or liquid against the outer surface of the seam to cool it to a temperature whereat the coating applied through the tubes 520 (or other coating apparatus) will not tend to blister.

Figure 13 shows, in diagrammatic fashion, how a conveyor line may be adapted for a complete welding and coating operation. The conveyor line is indicated generally as 610 and, beginning at the right hand end (Figure 13), the containers 10 are first welded in a conventional welding apparatus designated as 612. This welding operation is effected by moving the containers 10 in reciprocating motion toward and away from the welding apparatus 612 by means of the short conveyor 614 extending between the conveyor line 610 and the apparatus 612. After the welding has been completed, the containers are then moved down the conveyor line 610 until they reach a position opposite the spraying apparatus designated as 616. This may be any suitable spraying or coating apparatus, such as that illustrated in connection with Figures 1 to 6. The containers are then turned lengthwise on the conveyor 610 with the welded and now coated seams in the lowermost position. The containers then pass over a reheating apparatus 618. This may utilize a flame heat or an induction coil unit to increase the temperature of the seam and surrounding surfaces to properly bake the coating which has been previously applied. This reheating is employed because, as previously suggested, the coating must be applied at a substantially lower temperature so that it will not blister upon application. After the coating has been permitted to set for a predetermined period, however, much higher temperatures can normally be employed to bake the coating.

Figure 14 diagrammatically demonstrates how a welding, cooling, coating and reheating process may be carried out on a roll conveyor without the necessity of turning the containers. In this apparatus a cantilever welding and coating means is provided, substantially as shown in connection with Figure 12. Here the cooling is carried out by means of cooling jet carriers 710 and 712 positioned both inside and outside of the seam. The inner jet carrier 710 is mounted upon the same cantilever beam 714 which also mounts the coating unit here diagrammatically indicated by the block designated as 716. After the containers 10 have moved a predetermined distance down the conveyor, they then pass over the reheating unit here indicated as a gas jet strip heater 718 and the temperature is brought up to a baking level.

The strip heaters may be as long as necessary to transfer desired heat into the container.

It will be understood throughout this specification and in the appended claims that the reference to tubular articles is intended to mean all articles of the variety having enclosing sides either in the form of round cross sections, rectangular cross sections, or any other such section. It is not intended to limit the invention to round cylinders or the like, and it is believed that the meaning attached to the term tubular embraces such other configurations.

Certain features of the invention described herein are described and claimed in my divisional application Serial No. 273,505, filed February 5, 1952.

The detailed description has been made only for the purposes of illustration and the true scope of the invention is to be determined from the appended claims.

I claim:

1. In apparatus for processing the interior surfaces of enclosed articles, carriage means adapted to support the articles for rectilinear motion substantially parallel to the interior surface of the article, cantilever support means positioned to enter the interior of the enclosed articles as the articles are moved on the carriage, a burnishing device and a coating device, the burnishing and coating devices being mounted on the free end of the cantilever support means, control means arranged so that the burnishing device and the coating device are in operative relation to the surfaces to be processed as the article is moved on the carriage toward the cantilever support means, the control means being operative to disengage the burnishing device from operative position as the carriage is moved in a return path away from the cantilever support means.

2. Apparatus as in claim 1 wherein the carriage support means also provides means for the rotation of the tubular article about an axis thereof.

3. Apparatus as in claim 1 and further comprising means including reversible motor means for automatically driving the carriage in a complete operating cycle.

4. Apparatus as in claim 1 in which the mounting means for the burnishing means comprises parallelogram means.

STANLEY S. JOHNS.

References Cited in the file of this patent

UNITED STATES PATENTS

| Number | Name | Date |
|---|---|---|
| 1,441,484 | Conover | Jan. 9, 1923 |
| 1,460,088 | Wilson | June 26, 1923 |
| 1,586,263 | O'Neill | May 25, 1926 |
| 2,166,598 | Kronquest | July 18, 1939 |
| 2,181,319 | Flugge | Nov. 28, 1939 |
| 2,305,387 | Pearson | Dec. 15, 1942 |
| 2,511,474 | Kremer | June 13, 1950 |
| 2,512,542 | Goda | June 20, 1950 |